No. 674,252. Patented May 14, 1901.
S. C. ANDERSON.
DRAFT EQUALIZER.
(Application filed Oct. 5, 1900.)
(No Model.)
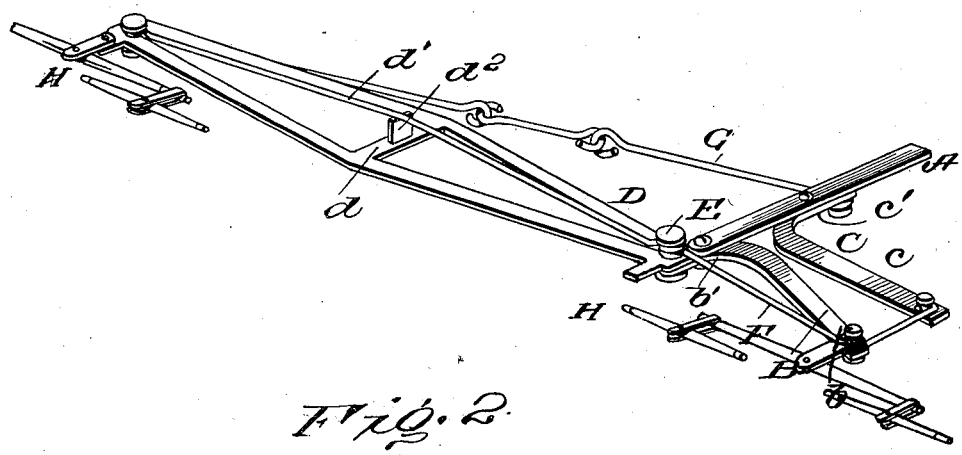
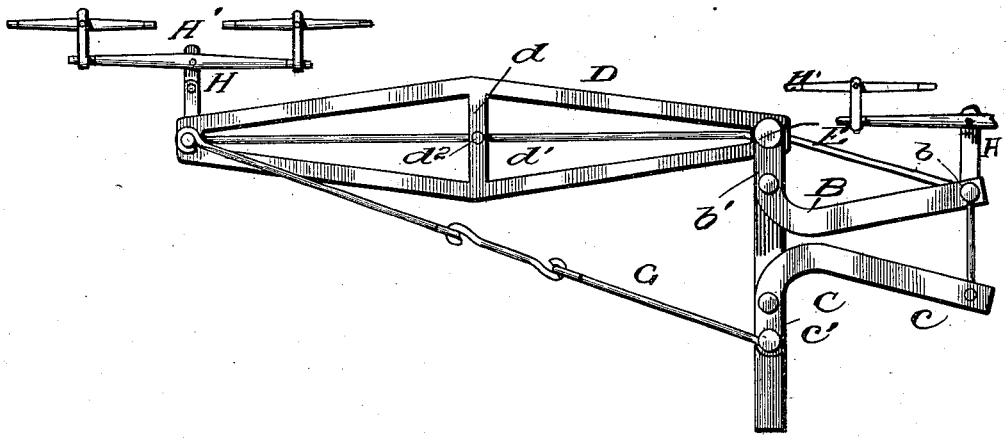
Witnesses
Inventor
Sam'l C. Anderson
By J. R. Nottingham, Attorney

UNITED STATES PATENT OFFICE.

SAMUEL CORNELIOUS ANDERSON, OF VAN ALSTYNE, TEXAS, ASSIGNOR OF TWO-THIRDS TO T. J. CLARK AND J. I. SOCKWELL, OF DALLAS, TEXAS.

DRAFT-EQUALIZER.

SPECIFICATION forming part of Letters Patent No. 674,252, dated May 14, 1901.

Application filed October 5, 1900. Serial No. 32,143. (No model.)

*To all whom it may concern:*

Be it known that I, SAMUEL CORNELIOUS ANDERSON, a citizen of the United States, residing at Van Alstyne, in the county of Grayson and State of Texas, have invented certain new and useful Improvements in Draft-Equalizers; and I do hereby declare the following to be a full, clear, and exact description of the invention, such as will enable others skilled in the art to which it appertains to make and use the same.

My invention relates to draft-equalizers, and has particular reference to that class of draft-equalizers used upon plows, harrows, grain-binders, and devices of a like character.

The invention consists generally of the novel construction of the several parts and their relative arrangement, as will be hereinafter more fully described, and particularly stated in the claims.

One of the objects of the invention is to so construct and arrange a draft-equalizer that the draft will be equally distributed among each of the animals attached thereto, so that one may travel in the furrow, if desired, and the remainder permitted to move over the unplowed ground.

Another object of the invention is to cheapen and simplify the construction of the device without in any way impairing its strength or durability.

These and other objects are attained by means of the mechanism illustrated in the accompanying drawings, in which—

Figure 1 is a perspective view of my improved device, and Fig. 2 a bottom plan view.

In both views the letter A indicates a short supporting-tongue, which may be attached to the forward end of a plow or other object to be moved in any suitable manner.

Fulcrumed to the outer end of the supporting-tongue is an angular lever B, which has its longer arm $b$ loosely connected to the longer arm $c$ of a similar angle-lever C, which is also fulcrumed on the supporting-tongue. The other or shorter arm $b'$ of the angle-lever B supports one end of a truss or skeleton bar D. It may be made of wood or metal, said truss-bar being pivoted to said arm $b'$ by a bolt E. The long arm $b$ is also connected to the bolt E by a link or rod F. The truss-bar is centrally provided with a cross-bar $d$ and is strengthened by a brace-rod $d'$, having its ends attached to the ends of the truss-bar and its center resting in the upper end of a vertical standard $d^2$, secured to the central bar $d$. The free end of the truss-bar is connected to the short arm $c'$ of the angle-lever C by a jointed rod G. It will be evident that a chain may be substituted for the jointed rod.

As my draft-equalizer is designed for four horses working abreast, I attach a double whiffletree H to the free end of the truss-bar and a double whiffletree H' to the long arm $b$ of the angle-lever B.

From the construction and arrangement of my improved draft-equalizer it will be apparent that the animals attached thereto will have the resistance of the load or pull equally distributed among them.

Having thus described my invention, what I claim, and desire to secure by Letters Patent, is—

1. In a draft-equalizer of the character described the combination of the tongue or buckhead of plow with the angle-levers pivoted thereto, the skeleton bar pivoted to one of said angle-levers and the links connecting said angle-levers and skeleton bar to equalize the draft, as set forth.

2. In a draft-equalizer, the combination of the supporting-tongue or buckhead, an angle-lever fulcrumed at the end thereof, a truss-bar pivoted to the short arm of said angle-lever, and an angle-lever fulcrumed to said supporting-tongue, to the rear of the first angle-bar, said levers and truss-bar being connected so as to distribute the resistance of the load among the draft-animals.

3. In a draft-equalizer, the combination with the supporting-tongue, an angle-lever fulcrumed at the end thereof, a second angle-lever fulcrumed back of the first and reversely thereto of a truss-bar pivoted to the short arm of first angle-bar, and links, substantially as described, connecting the ends of said truss-bar and angle-levers, to equalize the draft, as set forth.

4. In a draft-equalizer, the combination with the supporting-tongue, of an angle-lever fulcrumed at the forward end thereof, in such a manner that the short arm thereof will extend beyond the end of said tongue, a second angle-lever fulcrumed to said supporting-tongue, to the rear of the first and in such a manner that the short arm thereof will extend in a direction opposite to the direction of the short arm of the first angle-lever, of a skeleton bar pivoted to the short arm of the first angle-lever and extending in a direction at a right angle to said arm and provided on its upper side with a lug or standard, a brace-rod secured to the opposite ends of said skeleton bar and resting upon said lug or standard, and links substantially as described, connecting the ends of said angle-levers and skeleton bar to equalize the draft among the animals attached thereto, as set forth.

In testimony whereof I affix my signature in the presence of two witnesses.

SAMUEL CORNELIOUS ANDERSON.

Witnesses:
A. W. WALKER,
WM. VEAZEY.